United States Patent [19]

Roberge et al.

[11] Patent Number: 5,209,432
[45] Date of Patent: May 11, 1993

[54] AIRCRAFT REVERSER PORT DOOR

[75] Inventors: Gary D. Roberge, Jupiter; Edward B. Thayer, Palm Beach Gardens, both of Fla.

[73] Assignee: United Technologies Corporation, Hartford, Conn.

[21] Appl. No.: 908,138

[22] Filed: Jul. 2, 1992

[51] Int. Cl.$^5$ ............................................. B64C 25/68
[52] U.S. Cl. ................................. 244/110 B; 244/12.5; 239/265.27; 239/265.31; 60/230; 49/41
[58] Field of Search ............... 244/110 B, 12.5, 23 D; 239/265.27, 265.29, 265.31, 265.33; 60/230, 226.2; 49/40, 41

[56] References Cited

U.S. PATENT DOCUMENTS

| 2,847,822 | 8/1958 | Hausmann | 60/35.54 |
| 4,463,921 | 8/1984 | Metz | 244/3.22 |
| 4,552,309 | 11/1985 | Szaminski et al. | 244/110 B X |
| 4,557,073 | 12/1985 | Sandling | 49/41 |
| 5,082,209 | 1/1992 | Keyser | 244/110 B |

Primary Examiner—Joseph F. Peters, Jr.
Assistant Examiner—Christopher P. Ellis
Attorney, Agent, or Firm—Edward L. Kochey, Jr.

[57] ABSTRACT

Doors sealing radial flow ports are opened by rotation which slides the doors away from the ports. All doors rotate about a longitudinal centerline of the aircraft. Each flow port has its inlet seal surface with a center of curvature offset from the longitudinal axis. Rotation of the door toward the open position relieves and releases contact between the door and the port inlet seal surface.

6 Claims, 4 Drawing Sheets

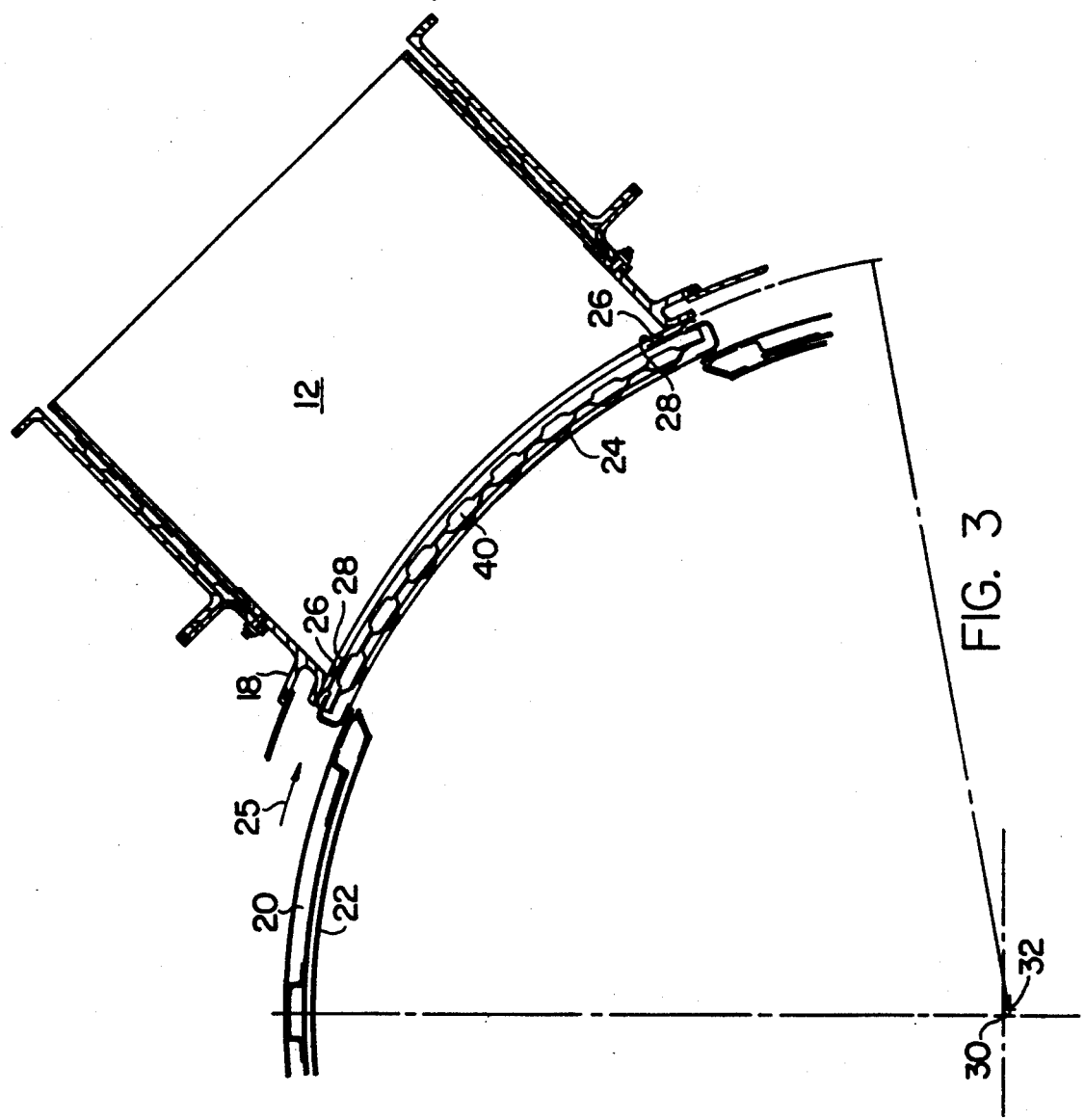

5,209,432

AIRCRAFT REVERSER PORT DOOR

The Government has rights in this invention pursuant to a contract awarded by the Department of the Air Force.

TECHNICAL FIELD

The invention relates to aircraft gas turbine engine exhaust through reverser ducts, and in particular to sealing of the reverser port door.

BACKGROUND OF THE INVENTION

Gas turbine engines on aircraft use the discharge force of gases for thrust to drive the aircraft. Braking forces may be obtained after landing or during flight by reversing the direction of the discharge.

Reverse thrust discharge involves a blockage of the rearward flowpath plus transfer of the axial gas flow to a radial flow. This radial flow has a forward component producing the reverse thrust.

U.S. Pat. No. 5,082,209 issued Jan. 21, 1992 to Andrew G. Keyser shows a plurality of reverser ducts extending outward from the central exhaust passage. A door sealing each duct is secured to a rotatable ring. The doors are rotated from the closed position to permit exhaust flow through the reverser ducts.

The doors which seal the entrance port to the reverser ducts must provide positive seal during normal forward thrust operation. These must continue to seal after completing numerous reverse thrust cycles. Wear and durability of the seal is therefore a major concern.

SUMMARY OF THE INVENTION

Surrounding the circular gas turbine exhaust gas passage there are existing a plurality of reverser ducts. These extend outwardly from the exhaust passage with a discharge component toward the front of the aircraft. Each duct has an inlet port and a port structure surrounding it.

An arcuate door is disposed at the entrance to each duct, sealing the port. The door is circumferentially moveable away from each duct around a door center of rotation. This center of rotation is the center of the exhaust passage, therefore all doors may be connected to a single pair of rings and rotated simultaneously.

A duct seal surface surrounds each port having two linear sides and two arcuate sides. The center of curvature for each arcuate side is offset from the center of rotation of the doors. It is offset in the direction toward the direction of door movement. Accordingly, as the door rotates, it increases its clearance from the seal surface. The compression on the seals which exists in the closed door position is progressively released and full clearance is obtained on rotation of 8 to 10 degrees. Accordingly, seal wear is decreased providing for effective sealing after many operating cycles.

BRIEF DESCRIPTION OF THE DRAWINGS

FIG. 3 is a sectional view similar to FIG. 1 showing one duct and the corresponding door in more detail;

DESCRIPTION OF THE PREFERRED EMBODIMENT

Figure 1:
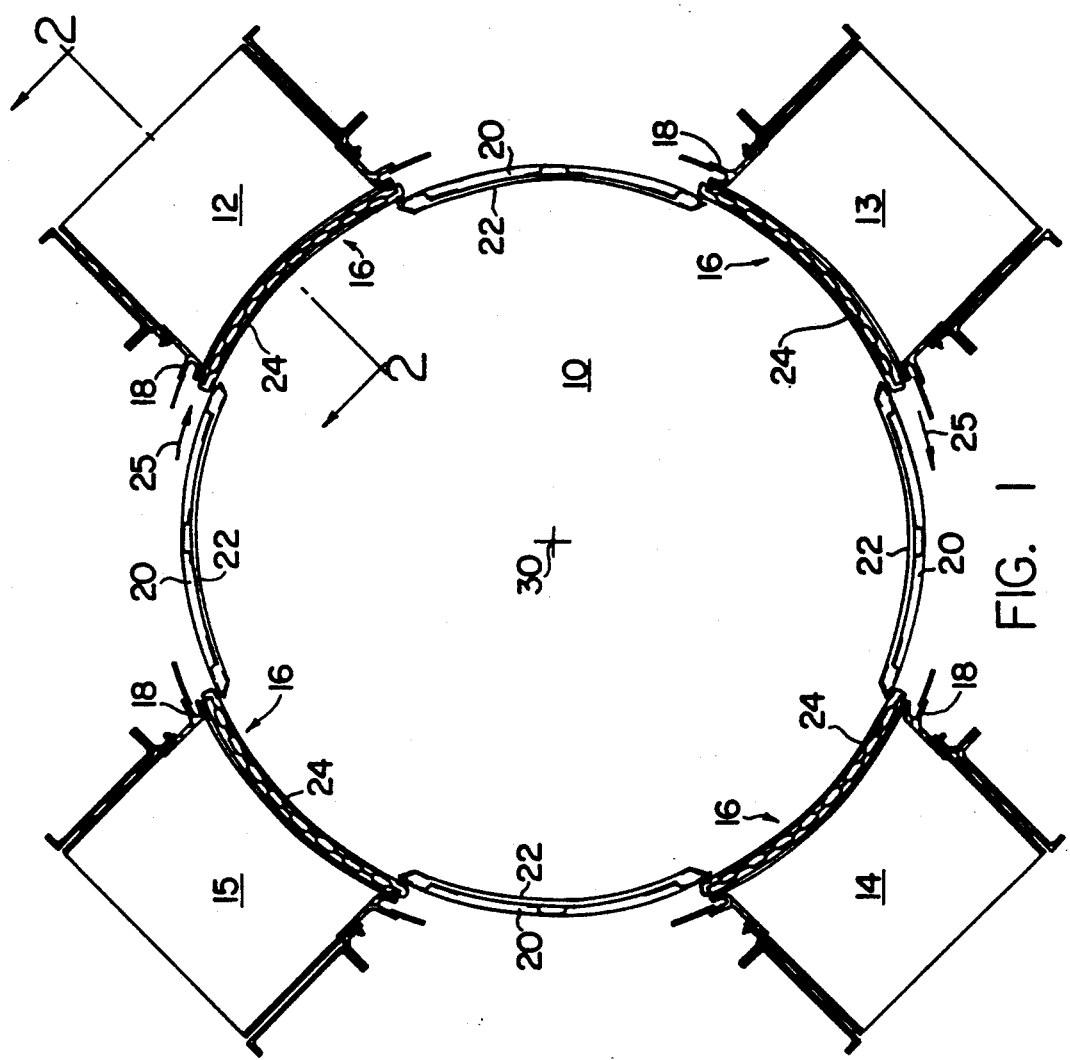
FIG. 1 is a sectional view taken longitudinal through the engine exhaust passage showing the location of the reverser ducts.

FIG. 1 shows a cylindrical gas turbine exhaust passage 10 conveying exhaust gas through a gas turbine engine. Four reverser ducts 12, 13, 14 and 15 extend outwardly from the exhaust passage. Each duct has an inlet port 16 with the surrounding port structure 18. The ports, as illustrated, are equally spaced and each opening subtends an angle of about 40 degrees.

Cooling air under pressure passes through cooling air flowpath 20 to cool the walls 22 of the exhaust passage. A door 24 is located at the inlet of each duct and is moveable clockwise in the direction shown by arrows 26.

Figure 2:
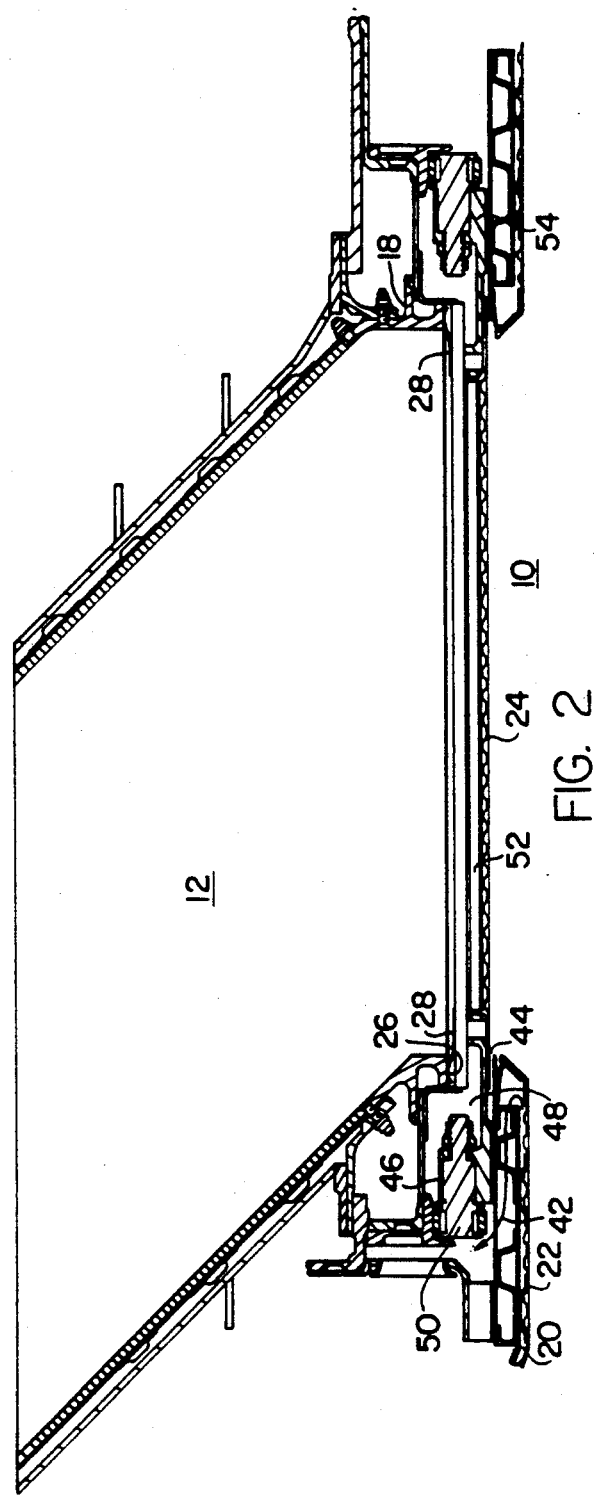
FIG. 2 is a side sectional view through an exhaust duct and port with the door closed.

Referring to FIG. 2, the surrounding port surrounding structure 18 has thereon an inwardly facing seal surface 26. A resilient seal 28 is secured around the periphery of each door. Being located around a circular duct there are two linear seal edges and two arcuate seal edges. The linear seal edges could each be formed of a single flexible finger seal. The arcuate seal edges are most conveniently formed by a plurality of overlapping fingers so as to permit flexing of the seal fingers without buckling.

It is these seals around the arcuate surface which are subject to extensive wear in the normal construction as the door rotates to the open position. These on the linear surfaces quickly clear the seal surface.

Referring to FIG. 3, the centerpoint 30 at the center of the exhaust passage is the center of rotation of doors 24. In this way all doors may be connected to a single structure and easily rotated. The center of curvature of seal surface 26 is offset in the direction of rotation 26 by 0.2 inches to point 32. It can be seen that as the door rotates around the centerpoint 30 toward the open position there is increasing clearance between the door and the seal surface 26.

Figure 4:
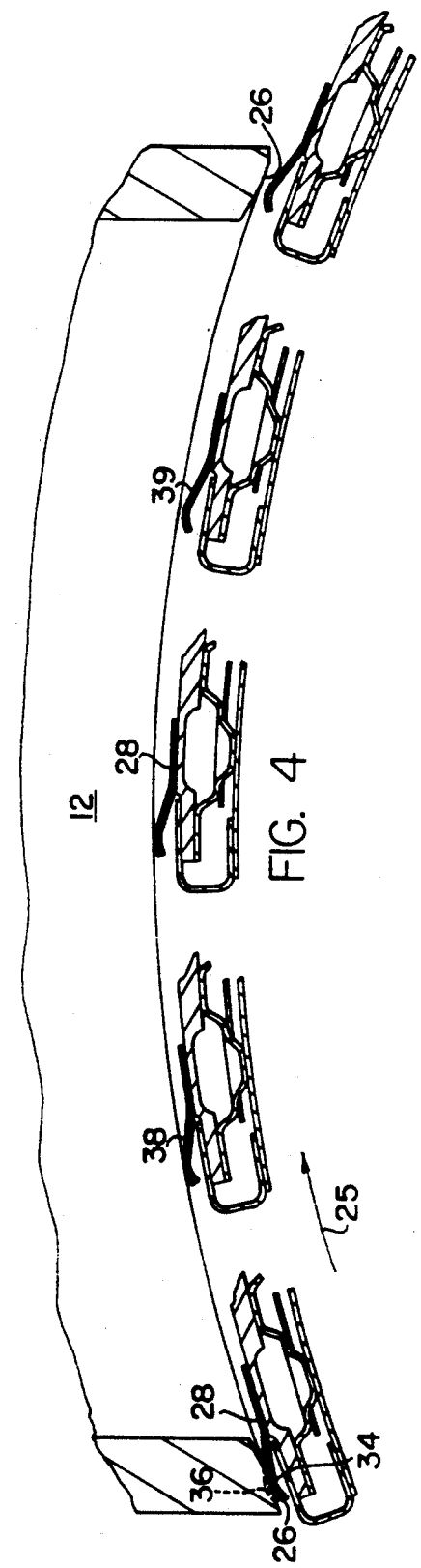
FIG. 4 is a section showing the seal on the arcuate surface rotated 90 degrees through a series of positions.

Referring now to FIG. 4, the flexible seal 28 is shown in the compressed condition 34 and in an exaggerated relaxed condition 36. The seal, as illustrated here, shows the seal on the arcuate surface, but rotated 90 degrees showing its position progressively during the opening of the door in direction 25. On the left side of the drawing, the compressed position 36 is shown bearing against seal surface 26. As it moves through an arc of 10 degrees to position 38, the seal is still rubbing against the surface, but with less force since it is partially decompressed. As it reaches position 39, the seal is free of the surface. The offset of the center of curvature of surface 26 from the center of rotation of the door permits this early release of contact and decreased wear on the seals.

In the closed position the door is in contact with the exhaust gas passing through the gas turbine exhaust passage. Accordingly, the door in this position requires cooling air. Referring to FIG. 3, the cooling air passing through cooling air flowpath 20 passes through the internal flow channels 40 in each door. Referring to FIG. 2, the cooling air flow passing through the cooling air path 20 passes through leakage path 42. A portion of this air exits through leakage path 44 to cool the local area and prevent ingress of hot gas into the cooling flowpath. A portion passes through openings in support ring 46 into zone 48 A portion of these openings contain bearings 50, the others remaining open for passage of cooling air.

This cooling air may then pass axially through channel 52 in the doors passing out through support ring 54 at the opposite end.

Figure 5:
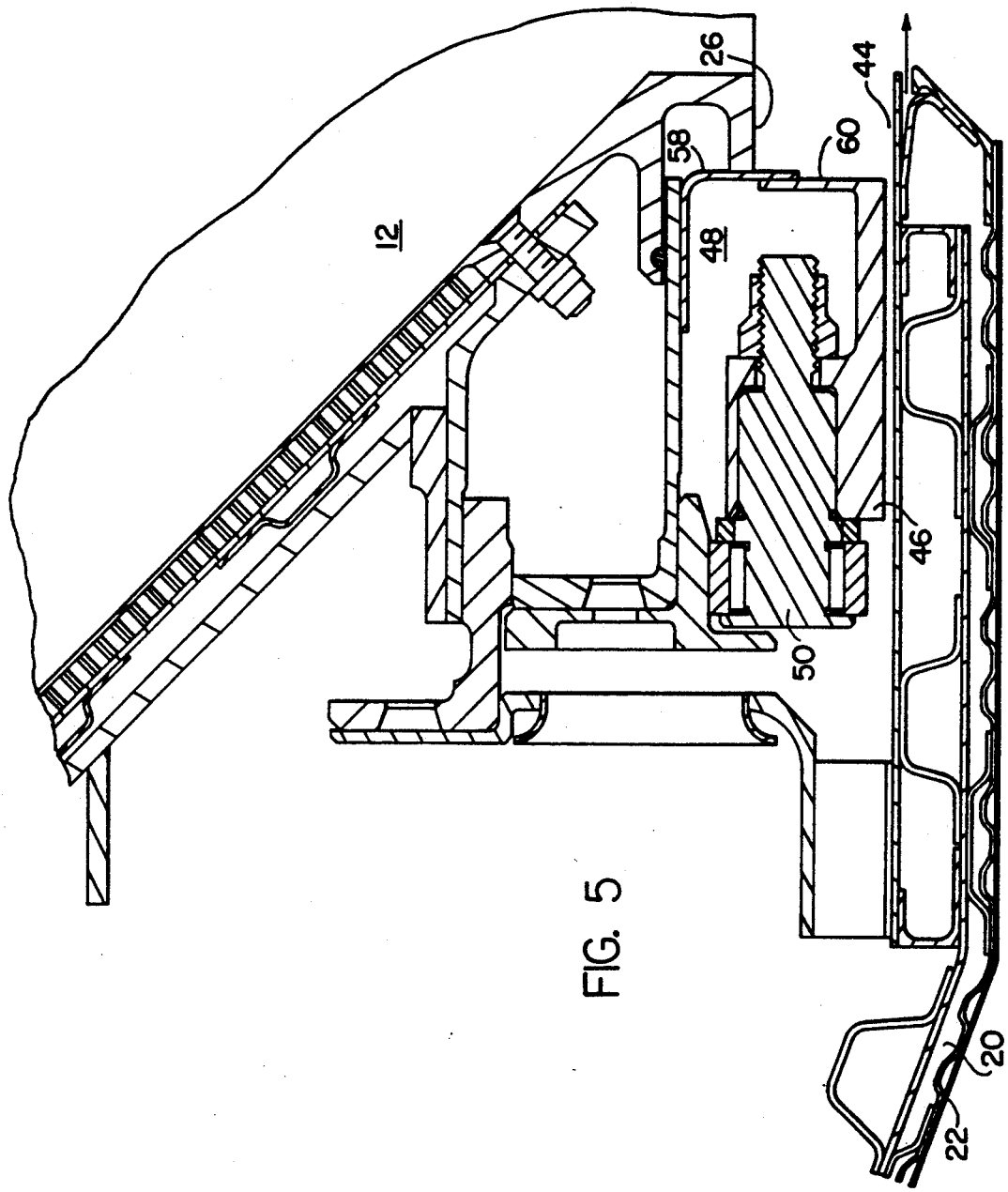
FIG. 5 is a side sectional view, similar to FIG. 2, with the door open.

As a door is rotated from the open position, it is located behind the wall 22 of the gas duct. Cooling air through the door is not essential at this time, However, it is important that the available cooling air not be dissipated through the opening left through the now removed door into the duct 12. Referring to FIG. 5, there is illustrated a full circumference seal ring 58 which is static and does not move with the doors. The rotating ring 46 which carries the doors also carries segmented seal member 60 which fills the space between the doors. The cooperation of seal members 58 and 60 prevent leakage of cooling air from zone 48 when the doors are open.

We claim:

1. A port door assembly for an aircraft having a gas turbine engine comprising:
    a circular gas turbine exhaust passage;
    a plurality of reverser ducts extending outwardly from said exhaust passage, each duct having an inlet port with a surrounding inlet port structure;
    an arcuate door disposed at each inlet port and circumferentially movable away from said port around a door center of rotation at the axial centerline of said exhaust passage;
    an arcuate peripheral duct seal surface on the port structure surrounding each port, having two linear sides and two arcuate sides, the center of curvature of each arcuate side being offset from said center of rotation in the direction of door movement to open said duct, whereby said door has increasing clearance from said seal surface as said door rotates toward the open position.

2. A reverser port door assembly as in claim 1 further comprising:
    a deflectable seal around the periphery of each door in sealing contact with said seal surface around said each port when said door is in the closed position.

3. A reverser port assembly as in claim 2 further comprising:
    the deflection of said seal in the door closed position related to the offset of said center of curvature and said center of rotation such that all deflection is relieved upon rotation of said door through an arc of not more than 10 degrees.

4. A reverser port assembly as in claim 1 further comprising:
    an annular cooling air flowpath concentrically surrounding said exhaust passage;
    a radial opening through said flowpath at each port location;
    a flow channel through each door for permitting coolant flow therethrough;
    a coolant opening on each end of each of said doors in fluid communication with said cooling flowpath when said each door is in the closed position.

5. A reverser port door assembly as in claim 4 further comprising:
    two support ring rotatably located within said annular cooling flowpath;
    each of said doors secured to and located between said two support rings;
    coolant flowpath openings through said ring in alignment with said doors secured thereto; and
    an impervious structure on said rings between the door support locations, sealing against structure surrounding said port when said doors are rotated to the open position.

6. A port door assembly for an aircraft having a gas turbine engine comprising:
    a circular gas turbine exhaust passage;
    a plurality of reverser ducts extending outwardly from said exhaust passage, each duct having an inlet port with a surrounding inlet port structure;
    an arcuate door disposed at each inlet port and circumferentially movable away from said port around a door center of rotation at the axial centerline of said exhaust passage;
    an arcuate peripheral duct seal surface on the port structure surrounding each port, having two linear sides and two arcuate sides, the center of curvature of each arcuate side being offset from said center of rotation in the direction of door movement to open said duct, whereby said door has increasing clearance from said seal surface as said door rotates toward the open position further comprising each of said ducts having an inlet port located in a common plane perpendicular to said axial centerline.

* * * * *